US011034373B2

(12) United States Patent
Fellema (10) Patent No.: US 11,034,373 B2
(45) Date of Patent: Jun. 15, 2021

(54) CART HANDLE COVER WITH POCKET

(76) Inventor: Karen L. Fellema, Wharton, NJ (US)

( * ) Notice: Subject to any disclaimer, the term of this patent is extended or adjusted under 35 U.S.C. 154(b) by 302 days.

(21) Appl. No.: 12/885,678

(22) Filed: Sep. 20, 2010

(65) Prior Publication Data

US 2012/0067474 A1    Mar. 22, 2012

(51) Int. Cl.
*B62B 5/06* (2006.01)
*B62B 3/14* (2006.01)

(52) U.S. Cl.
CPC ............ *B62B 5/069* (2013.01); *B62B 3/1448* (2013.01); *B62B 3/1428* (2013.01); *B62B 3/1436* (2013.01); *B62B 3/1472* (2013.01); *B62B 2202/023* (2013.01)

(58) Field of Classification Search
CPC ..... B62B 5/067; B62B 3/1448; B62B 3/1436; B62B 3/1472; B62B 2202/023; B65D 65/02
USPC ...... 150/154; 280/2–4, DIG. 4, 33.992, 204, 280/33.991; 383/4, 22
See application file for complete search history.

(56) References Cited

U.S. PATENT DOCUMENTS

| | | | | |
|---|---|---|---|---|
| 2,532,779 | A * | 12/1950 | Parks | 384/428 |
| 2,761,481 | A * | 9/1956 | Boatwright | 383/22 |
| 3,578,380 | A | 5/1971 | Jacobus | |
| 4,085,873 | A * | 4/1978 | Schweitzer | 294/142 |
| 4,512,504 | A * | 4/1985 | Owlett | 224/572 |
| 4,651,366 | A * | 3/1987 | Lande | B62B 3/1444 5/98.1 |
| 4,805,937 | A * | 2/1989 | Boucher et al. | 280/33.992 |
| 4,830,238 | A * | 5/1989 | Widinski et al. | 224/572 |
| 5,009,516 | A * | 4/1991 | Geeck | 383/37 |
| 5,040,711 | A * | 8/1991 | Niederhauser et al. | 224/572 |
| 5,131,513 | A * | 7/1992 | Gossage | 190/107 |
| 5,429,377 | A | 7/1995 | Duer | |
| 5,820,142 | A | 10/1998 | Duer | |
| 5,829,835 | A * | 11/1998 | Rogers et al. | 297/256.17 |
| 5,941,437 | A * | 8/1999 | Okumura | 224/585 |
| 5,961,018 | A * | 10/1999 | Abelbeck et al. | 224/584 |
| 6,065,764 | A * | 5/2000 | Moseley | 280/33.992 |
| 6,129,417 | A | 10/2000 | Cohen-Fyffe | |
| 6,237,998 | B1 | 5/2001 | Aprile | |
| 6,491,996 | B2 | 12/2002 | Digangi | |
| 6,676,210 | B1 * | 1/2004 | Peyton | 297/219.12 |
| 6,702,381 | B2 | 3/2004 | Endicott et al. | |
| 6,763,986 | B2 * | 7/2004 | Santos et al. | 224/585 |
| 6,817,066 | B1 * | 11/2004 | Williams et al. | 16/435 |

(Continued)

*Primary Examiner* — Sue A Weaver
(74) *Attorney, Agent, or Firm* — Mark Malek; Paul Ditmyer; Widerman Malek, PL (57) ABSTRACT

A cover for the handle of a shopping cart or similar devices, to reduce the transmission of contaminants present on such handles, comprises a bag having front and rear members, the members being connected such that an opening is formed therebetween; each member having an inner surface and an outer surface, the inner surfaces facing each other; a fastening means attached to each inner surface, the fastening means being positioned so as to interact with each other; a utility pocket attached to the front member; the utility pocket further comprising a storage pouch therein; and a transport pocket which is attached to the rear member, the transport pocket being sized to contain the cover therein when the cover is compacted; and the cover sized to fit onto the handle assembly of a cart, thereby forming a barrier between the handle and a user.

9 Claims, 9 Drawing Sheets

(56) References Cited

U.S. PATENT DOCUMENTS

| | | | |
|---|---|---|---|
| 6,896,164 B2* | 5/2005 | Fialla-Dori | 224/275 |
| D521,207 S * | 5/2006 | Anderson et al. | D34/27 |
| 7,100,982 B2* | 9/2006 | Lundgren | 297/256.17 |
| 7,568,707 B2* | 8/2009 | Kolpien | 280/33.992 |
| 7,984,724 B1* | 7/2011 | Eberle | 135/67 |
| 8,109,524 B1* | 2/2012 | Toohey et al. | 280/33.992 |
| 2009/0015046 A1* | 1/2009 | McClintock et al. | 297/219.12 |
| 2009/0133789 A1* | 5/2009 | Hall | 150/154 |
| 2017/0291627 A1* | 10/2017 | Grimmond-Schultz | B62B 3/1436 |

* cited by examiner

CART HANDLE COVER WITH POCKET

FIELD OF THE INVENTION

Embodiments of this invention cover the handle bar apparatus of various shopping carts or the like, such as, generally, manually propelled vehicles, providing a protective barrier between the user and any disease carrying microorganisms and/or other contaminants normally found on the cart handle. Once positioned on a cart, a portion of the cover where a utility pocket is located fits into the area between the cart handle and the leg opening bars forming a well which provides both open and secure storage. These embodiments also provide storage for items needed by the user (coupons, pen, list, telephone, etc.).

BACKGROUND OF THE INVENTION

Certain items displayed in public, or subject to being used by many individuals on a daily basis, are known to have significant contamination from various microorganisms, ranging from bacteria and mold, to viruses, and which can be transmitted by contact with the contaminated surface. It is known that the viability of microbes is lessened by dessication or drying out. It is also known that people's hands are one of the chief means of transporting contagions to and from surfaces, such as shopping cart handles.

In the opinion of this inventor, everyone should be using a cart handle cover to practice what will be referred to as "Shopper Etiquette" to help our society reduce the transmission of illness. It is known that a person can carry an infectious agent and yet not be ill at the moment; in many instances it is when people are "coming down with something" that they are the most contagious. Other individuals may be carriers of infectious disease, such as tuberculosis or hepatitis, yet not appear sick at all. These shoppers can still transfer infectious microbes to others via the cart handles. When a person is ill they shouldn't be shopping but, doubtless, on any given day, any supermarket or store that has a pharmacy therein probably has at least a few sick people shopping there. Young children with a cold are especially notorious for failing to practice "respiratory etiquette". They will sneeze all over the cart and handle assembly from their position as passengers of the cart. Even something as innocent as speaking can transmit microorganisms to other surfaces. Everyone creates minute amounts of spittle during speech, but it can be enough to land somewhere on a cart handle bar to be picked up by the next shopper or child. In all the above scenarios, a personally owned, removable and washable cart handle cover would provide safety for that user as well as show "Shopper Etiquette" for subsequent users.

A number of handle covers have been described in the prior art, but do not appear to afford the public a convenient or adjustable type of storage to aid the shopper. None offer the ease of use, shopper's comfort or level of protection as do embodiments of the present invention. Those enveloping only the handle bar and attached with a hook and loop fastener, such as VELCRO® (registered trademark of Velcro Industries, B.V., Ltd,) along the bar are more cumbersome to apply than simply slipping the cover of the present invention over the entire handle bar apparatus. They appear to create a bulky, uncomfortable and possibly abrasive grip for the user. They do not adjust to different size cart handles, nor accommodate the coin operated release mechanism found on some types of supermarket shopping cart handles. They do not cover the side assemblies nor the incidental bars between the handle and the leg openings for a child's protection, and those embodiments that incorporate a padded baby seat are inappropriate for a shopper with no baby or a child who has outgrown the padded baby seat.

For example, in U.S. Pat. Nos. 5,429,377 and 5,820,142 Duer discloses a number of handle bar cover embodiments which enclose only the handle bar, or drape over the corners of a cart. None of these embodiments can accommodate any type of attachment on the bar (coin return mechanism); neither do they cover the side assembly or the incidental bars between the handle bar and the leg openings, nor provide any means of storage.

Jacobus (U.S. Pat. No. 3,578,380) discloses a child seat cover that attaches to the bar by a tightening means, such as an elastic drawstring. This means of attachment does not completely envelope the leg openings, and the entire undersurface of all the bars is exposed. The drawstring attachment suggests that the device is not sufficiently secured to withstand the efforts of a moving child. Further, it appears that any stored items of substantial weight, or actions such as the child simply pushing on the cover, would pull the cover off the handle bar where it is not attached, exposing it further. There is no sealable pouch/pocket handy to the shopper.

In U.S. Pat. No. 6,491,996 B2 Digangi discloses a child seat cover that uses VELCRO® (registered trademark of Velcro Industries, B.V., Ltd.) tabs to secure the cover, but leaving the underside of the bar and assembly exposed. The cover is draped over the side of the cart, apparently offering no secure attachment against a restless child. Stored items of any substantial weight, or even the actions of a child simply pushing on the cover, would pull the cover off the handle bar where it is not attached, further exposing the handle bar. There is no provision for a sealable pouch/pocket that is handy to the shopper.

Cohen-Fyffe (U.S. Pat. No. 6,129,417) discloses attachment of a cover by folding the fabric over the cart handle. The cover is neither adjustable to various cart sizes, nor can it accommodate handle bar attachments. The leg openings are unsecured and can allow a child to get their hands into the assembly from their position in the seat. The device does not have a pouch/pocket for storage.

In U.S. Pat. No. 6,702,381 B2 Endicott discloses a universal blanket and removable safety belt for use with a variety of child seat assemblies, such as a high chair or shopping cart. Although a safety belt is supplied to secure the child to the seat, the leg openings are unsecured and can allow a child to get their hands into the assembly. The device has no allowance for adjustment to the various sized carts nor for their possible attachments (coin return mechanism), and no sealable pouch/pocket for storage. Because the child is only secured using a safety belt, the invention appears to be easily dislocated by a moving child.

Aprile (U.S. Pat. No. 6,237,998 B1) discloses a baby seat cover that uses the child's safety strap through the rear bars to secure the cover to the shopping cart. The front of the cover is reinforced at the corners by stitching, and is draped over the handle bar. Because of this securing mechanism, a child could easily maneuver underneath this invention. A pouch that hangs at the bottom of the cover and serves as a foot guard for the child appears to be an unreliable place to store items because anything of weight in the pouch would disrupt the placement of the cover if the child were seated therein. The weight of the pouch pulling on the cover appears to create a situation where a well for open storage could not be provided.

There clearly is a need for this invention. First, individuals in our health conscious population are mindful of the myriad of contaminants and microbes found on shopping cart handles which are rarely, if ever, cleaned effectively. These handles expose everyone who uses them to whatever infective microbes were deposited there by the many prior users. Viable microbes can survive on nonporous surfaces for days (even weeks given optimal environmental conditions). Thus not only is the shopper exposed by contact with the bar but all child passengers are exposed by contact with the bar and many of incidental structures in front of his/her seat. While some stores have started to provide wipes to sanitize shopping cart handles, these wipes are used at the discretion of the individual, and may not always be available. More importantly, it is not widely advertised that, in order for many of these wipes (for example only, LYSOL® disinfecting wipes, registered trademark of Reckitt Benkiser, NJ) to be truly effective, the solution they contain must remain wet on the surface for approximately 10 minutes and air dry (www.lysol.com/products/disinfecting-wipes/dwipes-4-in-1). This delay makes the product's use time-consuming, and potentially misused.

Utilizing a protective porous barrier would not only reduce contact but also hasten the desiccation of the microbes, further reducing the transmission of disease. According to the website of the National Institutes of Health, Fomites are a potential vehicle of infectious pathogens in the environment (citations omitted). Nonporous fomites are particularly important in fomite-mediated disease transmissions because they appear to have more capability to transfer pathogens to hands than porous fomites. (citation omitted)

(http://www.nchi.nlm.nih gov/pmc/articlesPMC2547042)

Second, attached to the upper surface of the cover is a sealable pouch which contains a sealable pocket inside it. The pouch can hold the items the user may need handy, such as, for example only, coupons, lists, pen, etc. The internal sealable pocket serves as a secured place in which to carry items such as a credit card, cash, store discount card(s), a cellular telephone or "smartphone", etc. By having these items secured in the pocket the user has a more secure manner of shopping, because personal items, for example, a handbag, can be kept closed in the base of the cart or even left locked in the shopper's car, instead of, as is often seen, in the child seat, where thieves may gain access to its contents.

Some people have a sensitivity to certain types of antibacterial products, such as wipes or sanitizers, and the use of an embodiment of the present invention will enable such persons to avoid the need to utilize products to which they are sensitive. Also, use of embodiment of the present invention can protect against a child's tendency to put their mouth on a cart handle surface.

In use, the shopping cart handle apparatus to be completely enveloped includes the entire length, width and depth, both above and below the handle bar along with any attachments thereon (coin return mechanism, etc.) as well as the assemblies that attach the handle bar to the cart. Also enveloped would be any bars incidental to the construction of the various styles of shopping carts as may be found between the horizontal handle bar, to and including the bars of the leg openings of the child seat(s).

BRIEF SUMMARY OF THE INVENTION

An object of the present invention is to provide a protective barrier against contagions present on a cart that may be hazardous to the user or a child.

Another object of the present invention is to provide a cover that is porous and therefore less supporting of microbial viability reducing the likelihood of disease transmission.

Yet another object of the present invention is to provide a means for practicing "shopper etiquette".

Still another object of the present invention is to provide a cover that has a sealable utility pocket for the purpose of storing coupons, lists and the like.

Yet another object of the present invention is to provide a cover that has an internal sealable pocket within the utility pocket to store items such as a credit/debit card, cellular telephone, and the like.

Yet another object of the present invention is to provide a place for storing children's items so they are accessible to the user and be provided to occupy a child's attention.

Another object of the present invention is to provide a shopper with a secure means of accessing coupons, lists, and the like, while reducing the exposure of a handbag to potential thieves.

Another object of the present invention is to provide a cover that can conform to the shopping cart and which provides a convenient place to stow certain items as a shopper requires for the task (brochure, beverage bottle, snack, coupons, lists, pen and the like).

Another object of the present invention is to provide a cover that can withstand the activity of a restless child.

Yet another object of the present invention is to provide an adjustable cover that can accommodate various sized shopping carts.

Still another object of the present invention is to provide a cover that can accommodate additional devices that are attached to cart handles, such as a coin return and chain mechanism.

Another object of the present invention is to provide a cover that is washable and reusable.

Still another object of the present invention is to provide a cover that is portable, durable, convenient and easily attached.

Still another object of the present invention is to provide a cover that can be attached and removed with minimal contact of the cart handle.

Yet another object of the present invention is to provide a cover that is non-hazardous to children (no small objects, cords).

Another object of the present invention is to provide the shopper/child with a dry contact surface in wet weather when environmental conditions are more supportive for microbial life.

Yet another object of the present invention is to provide shoppers sensitive to antiseptic wipes with another means of protection.

Another object of the present invention is to provide a cover that is eco-friendly.

Still another object of the present invention is to provide a measure of protection to children in the child seat.

Another object of the present invention is to provide a cover that is self-contained in its own transport pocket offering a compact means of storing/carrying when not in use.

Embodiments of the present invention envelope the entire length, width and depth of the handle bar apparatus both above and below it. The finished expanded length is sufficient to cover the entire handle bar apparatus of up to a "full size double child seat" shopping cart. An elastic material sewn into the opening ensures a secure fit on smaller sized carts.

Embodiments of the present invention can be deployed without touching the cart handle; it is merely slipped over the handle assembly where the hook and loop fastener catches itself in the leg openings. Removal is just as simple by releasing the hook and loop fasteners and slipping it off. Embodiments of the present invention are washable, reusable and durable, and are thus eco-friendly. It is portable, unbreakable and non-hazardous to children as there are no detachable parts to choke on nor cords to strangle nor plastic to cause suffocation.

This invention is a cover for the handle of a shopping cart or similar devices, to reduce the transmission of contaminants present on such handles, comprises a bag having front and rear members, the members being connected such that an opening is formed therebetween; each member having an inner surface and an outer surface, the inner surfaces facing each other; a fastening means attached to each inner surface, the fastening means being positioned so as to interact with each other; a utility pocket attached to the front member; the utility pocket further comprising a storage pouch therein; and a transport pocket which is attached to the rear member, the transport pocket being sized to contain the cover therein when the cover is compacted; and the cover is sized to fit onto the handle assembly of a cart, such as a shopping cart of the like, thereby forming a barrier between the handle and a user.

BRIEF DESCRIPTION OF THE SEVERAL VIEWS OF THE DRAWING

FIG. 4 shows an embodiment of the present invention mounted on a shopping cart.

FIG. 9 illustrates the preparation of the utility pocket, FIG. 9A showing the initial layout, and FIG. 9B showing an embodiment of a completed utility pocket.

DETAILED DESCRIPTION OF THE INVENTION

Embodiments of the present invention include a cover designed to cover the handle bar apparatus of various types of, generally manually operated, carts, such as, but not limited to, shopping carts, lumber carts, strollers, carriages, walkers, wheelchairs and the like, and can also include motorized wheelchairs, scooters and the like. Additionally, these embodiments can provide storage for various items, such as, for example only, coupons, a pen, shopping list, telephone, etc.). As will be described further, once deployed a portion of the cover with the utility pocket can be positioned in the section between the cart handle and the leg opening bars to conform to that hollow area and form a well or caddy providing an area of both open and secure storage. More specifically, a portion of the front member with the utility pocket is configured to be positioned in an area between the handle and a lift gate having leg opening to from a well for storage. The fasteners interact with each other to fasten the front and rear members within the leg openings of the shopping cart handle assembly.

Figure 1:
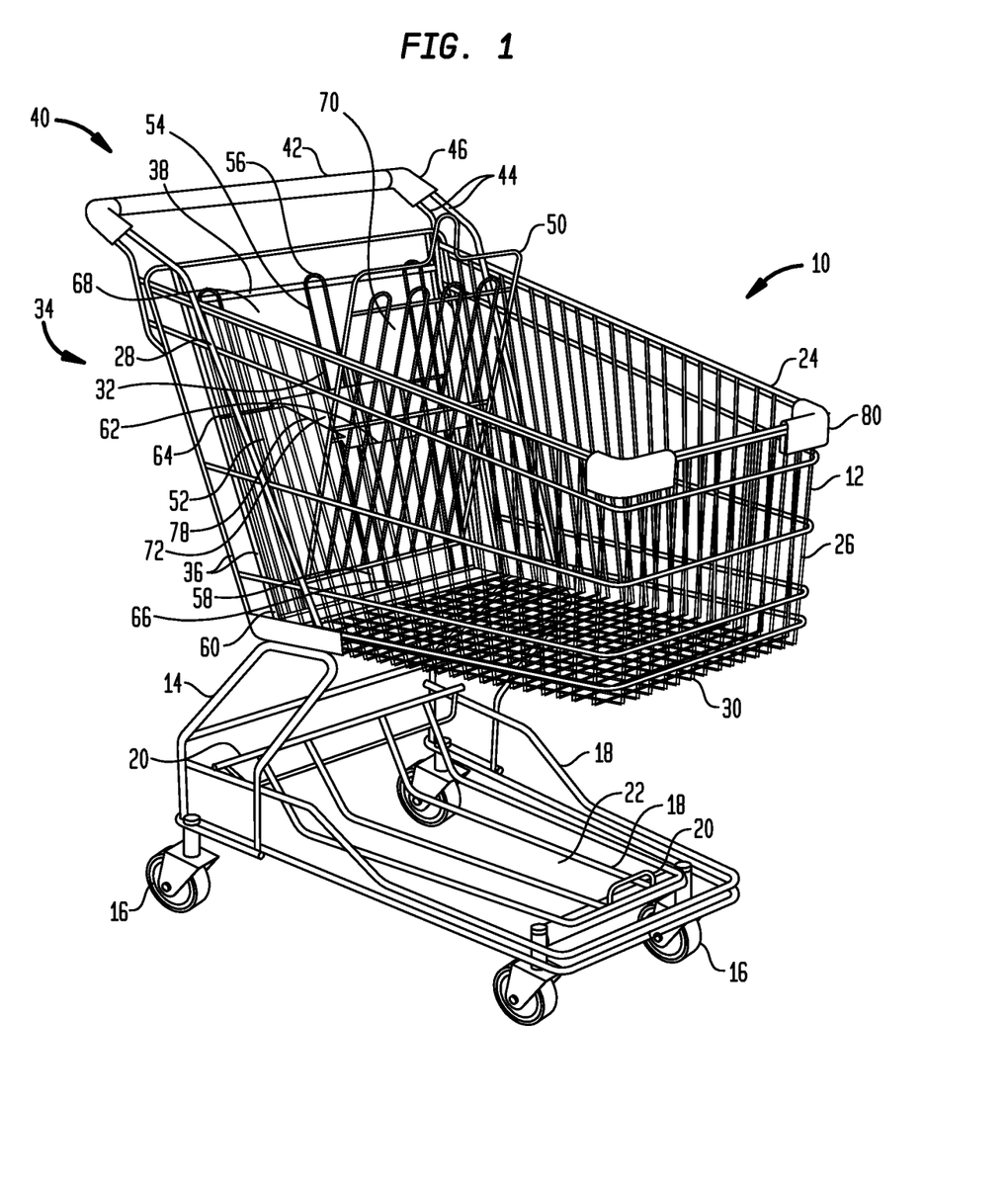
FIG. 1 illustrates a typical supermarket shopping cart.

For purposes of example only, the specification will illustrate the application of embodiments of the present invention on a shopping cart. The structure of a typical shopping cart is commonly known to those skilled in the art. This specification will describe those features relevant to the use of embodiments of the present invention, omitting many details of cart construction. Referring to FIG. 1, a typical shopping cart 10 (FIG. 1) is manufactured from metal, but could also be made from other materials, such as plastic, or a combination of materials. The cart 10 comprises a main basket 12 supported by a lower frame 14 that is generally mounted on a plurality of casters 16.

The lower frame 14 may include side frame elements 18 and cross-frame elements 20 that define a secondary basket area 22 in which generally, bulky or case goods are placed while shopping.

The basket 12 is framed by a pair of side frame members 24, a front frame member 26, and a back end 28, which enclose the base 30. The back end 28 comprises a lift gate 32 that is pivotably attached to a rear frame assembly 34, which comprises a pair of side members 36 and a cross-member 38 which is pivotably attached between the side members 36. A handle assembly 40 is attached to rear frame assembly 34 at the rear frame assembly side members 36. The handle assembly 40 includes a handle 42 and side handles 44, which are joined together by methods known to those skilled in the art, and which will not be further described. In the embodiment shown in FIG. 1, the handle 42 and side handles 44 include a reinforcing member 46 at the junction between them. The reinforcing member 46 is generally made from a plastic material, and although shown on the embodiment in FIG. 1, may or may not be present on different types of shopping carts.

Also attached to lift gate 32 is a seat assembly 50. Lift gate 32 comprises a plurality of long 52 and short 54 members. The long members 52 are attached at their top end 56 to cross-member 38, and at their bottom end 58 to bar 60. The short members are attached at their top end 62 to rod 64, and at their bottom end 66 to bar 60, the members 52 and 54 being assembled with cross-member 38 and rod 64 in such a manner to define a pair of leg openings 68. A movable seat back 70 is pivotably attached to bar 60, and a seat 72. A flap 78, generally of plastic, serves both to close the leg openings 68, or if the flap 78 is folded to a "down" position, forms a seating surface upon which a child (not shown) may be seated.

As shown in FIG. 1, the basket 12 may include a reinforcing member 80 at the junction between the side members 24 and the front member 26. This reinforcing member 80 is generally made from a plastic material, and although shown on the embodiment in FIG. 1, may or may not be present on different types of shopping carts.

The movement of the cart 10 is controlled by the handle assembly 40

Figure 2A:
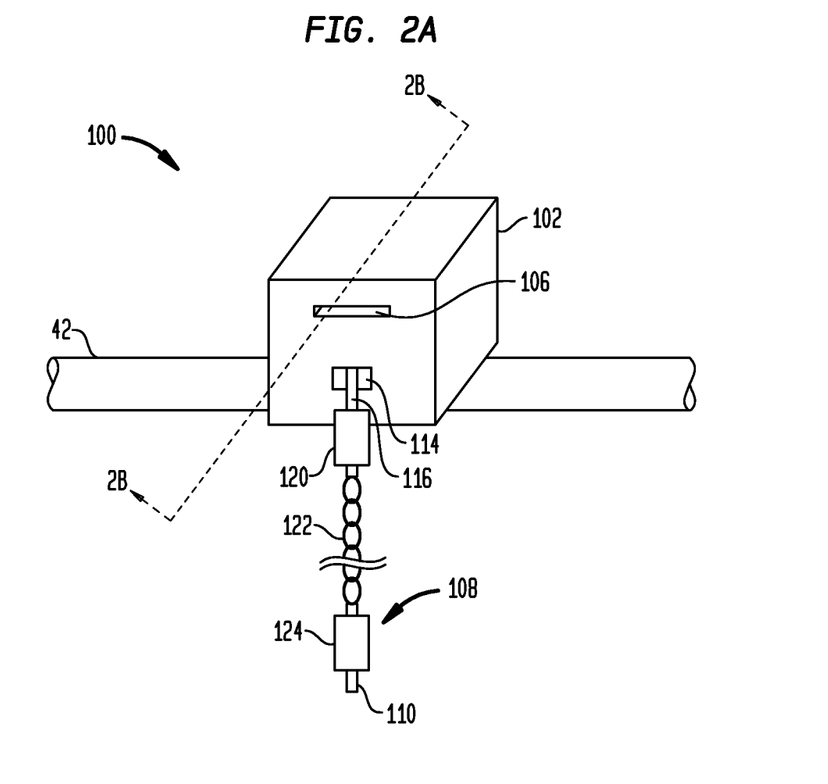
FIG. 2A illustrates a representative coin release mechanism that is attached to a shopping cart.
Figure 2B:
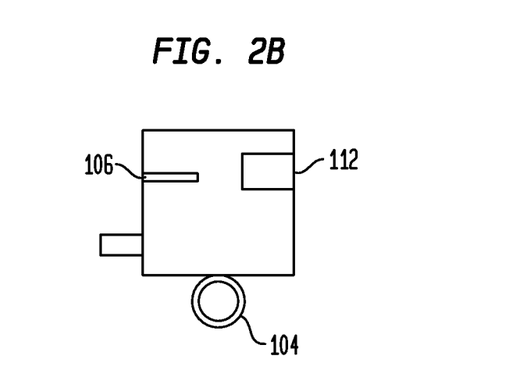
FIG. 2B is a side sectional view taken along lines 2B-2B in FIG. 2A.

FIG. 2 illustrates a coin-operated security mechanism 100 that may be found on supermarket carts, in order to prevent theft and to encourage the user to return the cart to a specified location near the store. The security mechanism 100 comprises a body 102 that is attached to the handle 42 by an attachment means 104, and one side, generally the side facing the user, contains a receptacle 106 into which a coin, such as a quarter, is placed. When the coin is placed into the receptacle 106, an end 110 of a locking means 108 is released from a slot 112 in the opposite side of the body, thereby releasing the cart to the user. The internal mechanism by which the coin's insertion causes the release of the locking means end 110 is not shown in the drawings. In the embodiment shown, the locking means 108 comprises a fastener 114 that pivotably receives end 116 that is attached to block 120 and which is connected by a chain 122 to a second block 124, from which a projection 110 that serves as the locking mechanism, extends. The locking means 108 is connected to the body 102 of a second security mechanism 100 that is attached to a second cart (not shown). When the user has finished with the first cart 10, the first cart 10 is pushed into a second cart such that they nest together, the user then inserts a locking mechanism 110 from the second cart into the slot 112 of the first cart 10, causing the coin to be dispensed from receptacle 106 and returned to the user. The security mechanism 100 adds both bulk and height to the handle 42, and because the security mechanism 100 is exposed and handled by many individuals in a day, it is also a source of contamination.

Figure 3A:
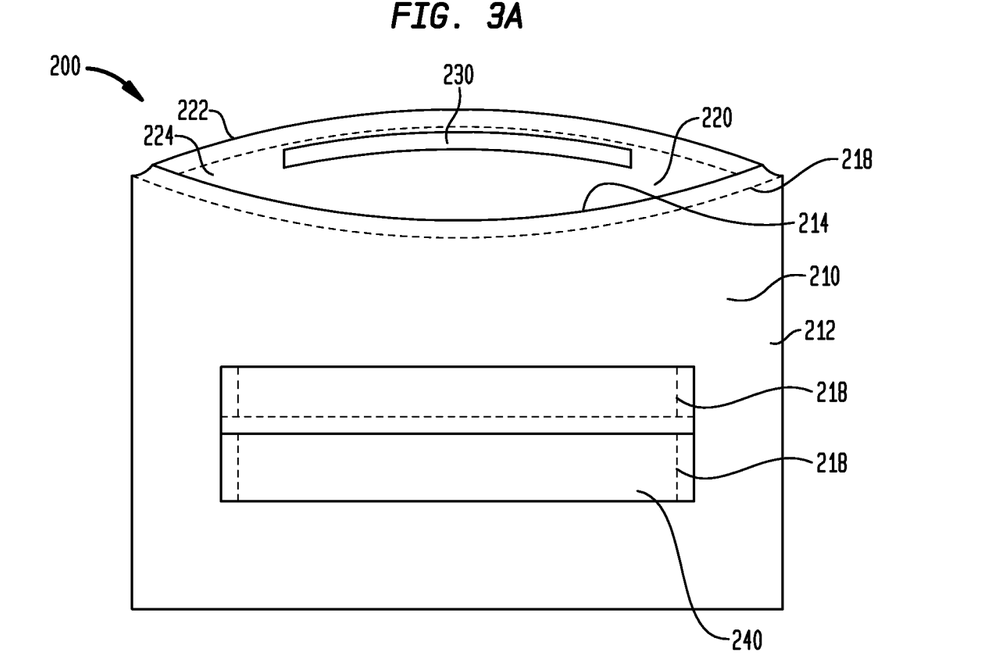
FIG. 3A illustrates a front view of an embodiment of the present invention, showing the utility pocket.
Figure 3B:
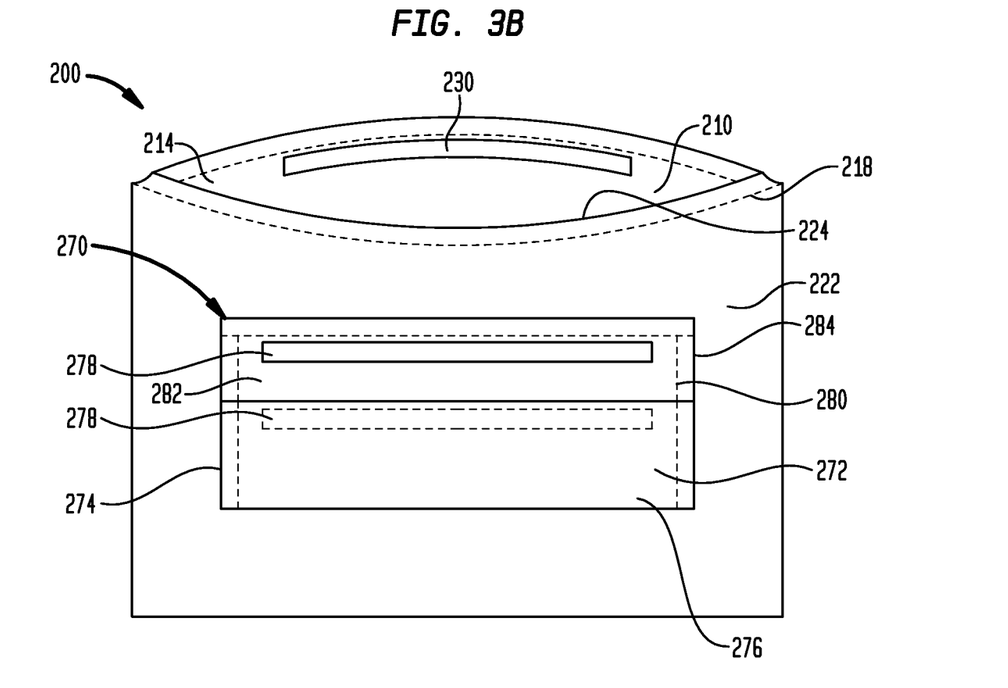
FIG. 3B is a rear view of the embodiment shown in FIG. 3A, showing the transport pocket with the cover flap in an open position.

An embodiment of the present invention is a cover 200, shown in FIG. 3. Cover 200 comprises a front piece 210 and a rear piece 220, each piece having an outer surface (or "right side") and an inner surface (or "wrong side"). Front piece 210 includes outer surface 212 and inner surface 214; rear piece 220 includes outer surface 222 and inner surface 224. As used in this specification, when referring to the fabric, the terms "right side" and "wrong side", as known to those skilled in the art, mean the top side, or decorative surface of the fabric, and the bottom side, or non-decorative side of the fabric, respectively.

The front piece 210 and rear piece 220 begin as one piece that is folded in half and the halves joined together at their sides by stitching (not shown), and at their upper ends by means of a fastener, such as a strip of a hook and loop fastener 230 which is attached to each of the inner surfaces 214 and 224.

Outer surface 212 contains a utility pocket 240. In the embodiment shown in FIG. 3A, utility pocket 240 is attached to outer surface 212 by stitching 218, but in other embodiments, utility pocket could be attached by means of hook and loop fasteners so that it is removable and can be carried separately, or the utility pocket could be a pocket that is sewn into the outer surface, proximate a slit in the outer surface, in the same manner that a pocket is sewn into a pair of trousers.

The utility pocket 240 comprises a back member 242, a flap 244 and a front member 246. The back member has a front surface 248 and rear surface 250, the rear surface 250 being attached to front piece outer surface 212.

Figure 8A:
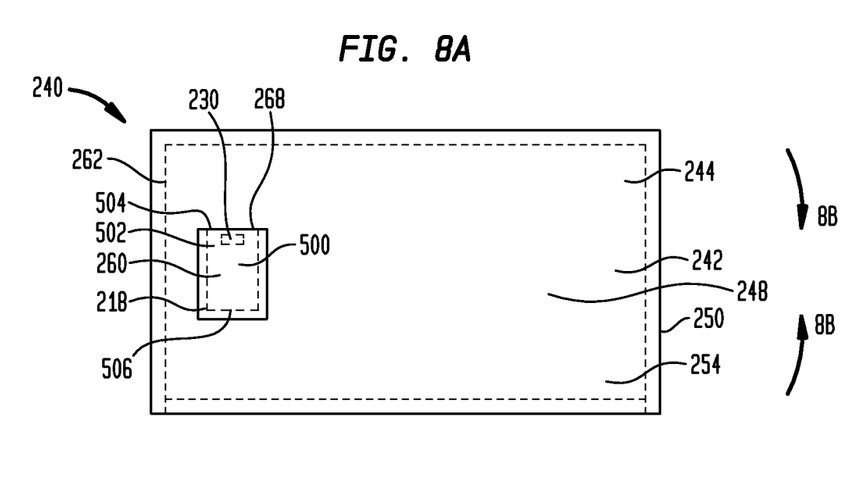
FIG. 8A illustrates the initial preparation of the utility pocket. The arrow 8B indicates the direction of folding of the front member.
Figure 8B:
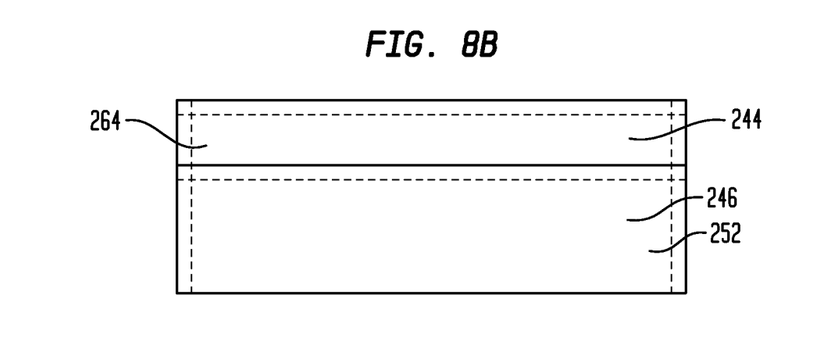
FIG. 8B illustrates the utility pocket after the front member has been brought into position with respect to the back member.

Attached to the front surface 248 is a storage pocket 260, (FIG. 8A) whose size can vary, from being only a portion of the length of the utility pocket, or any size up to and including the length of the utility pocket itself. As seen in FIG. 8A, storage pocket 260 is a fraction of the size of the utility pocket, and is sized to hold small items such as, for example only, credit cards, a change purse or a cellular telephone.

The storage pocket 260 is attached to front surface 248 by means of stitching 218, but in other embodiments, storage pocket 260 could be attached by means of hook and loop fasteners so that it is removable and can be carried separately, or the storage pocket could be a pocket that is sewn into the front surface 248, proximate a slit in the front surface, in the same manner that a pocket is sewn into a pair of trousers.

The front member 246 has a forward surface 252 and rearward surface 254, the rearward surface 254 opposed to the back member front surface 248, and attached along their distal ends by an attachment means, such as stitching 218, to form the utility pocket 240.

The flap 244 has an inner surface 262 and an outer surface 264, and the inner surface 262 contains one or more fasteners 230 thereon, such as hook and loop fasteners, which mate with a corresponding fastener 230 on the front member front surface 252.

Utility pocket 240 contains a storage pocket 260, described previously. Generally the storage pocket is formed by attaching a piece of fabric 500 to the back member front surface 248, and leaving the top 268 open. In another embodiment, one or more closure devices 230, such as hoop and loop fasteners, could be positioned within the top 268 of storage pocket 260 and enable the storage pocket to be closed. Other embodiments (not shown) may include additional storage pockets.

Figure 6:
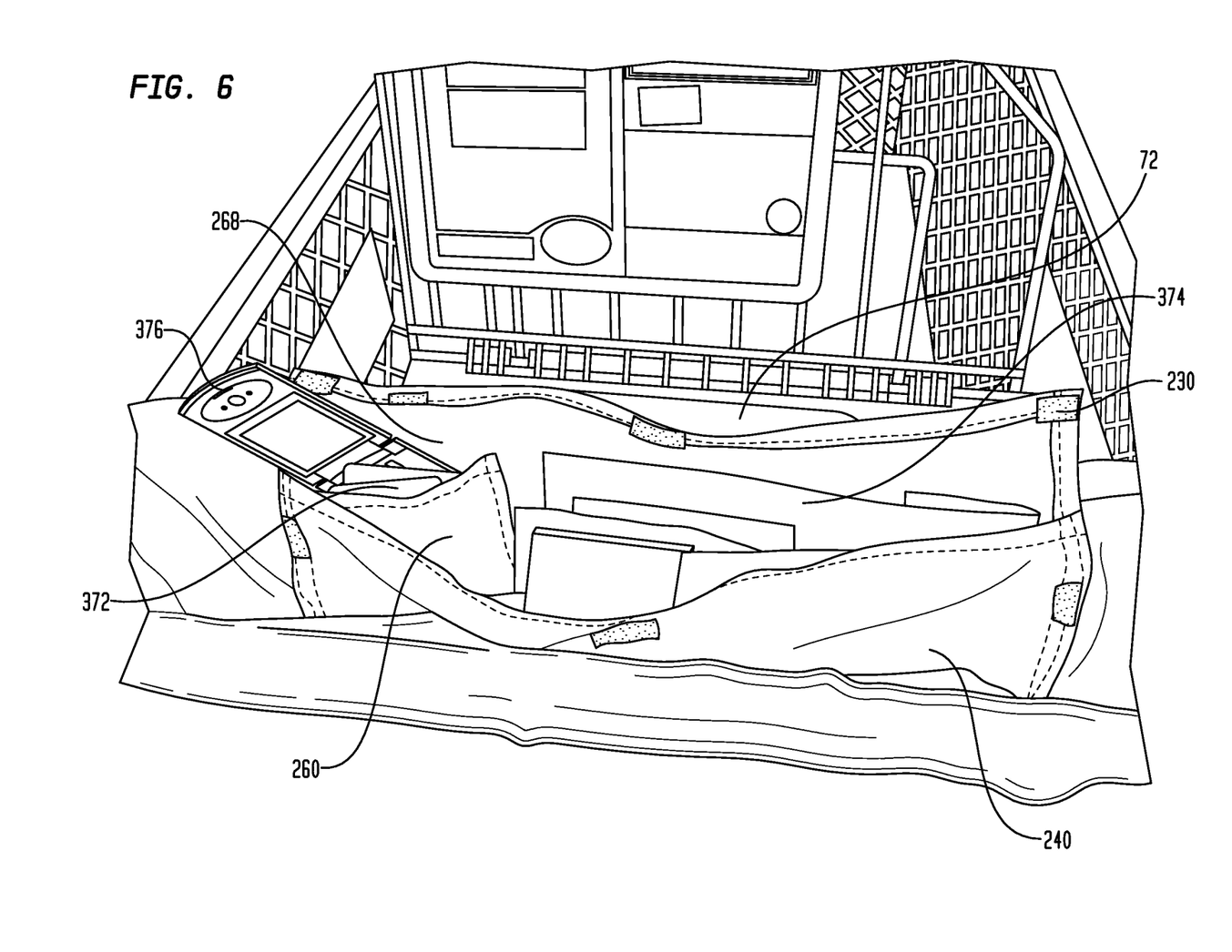
FIG. 6 shows the pocket from FIG. 5 in an open position, showing the security pouch therein and several items in the pocket.

The remaining space within utility pocket 240 can be used to hold one or more of a variety of items carried by the user, and while this list is not meant to be exhaustive, may include a credit card 372, coupon 374, cellular telephone 376, a writing instrument, calculator, and the like (FIG. 6).

Referring to FIG. 3, outer surface 222 includes a transport pocket 270. In this embodiment, the transport pocket 270 is attached to outer surface 222 by stitching 218, but in other embodiments, transport pocket 270 could be attached by means of hook and loop fasteners so that it is removable and can be carried separately.

Transport pocket 270 (FIG. 3B) includes an inner flap 272 with an inner surface 274 and outer surface 276, with the outer surface 276 having fastener 278 attached thereto. The fastener 278 can be a fastener such as a hook and loop fastener, a snap, a button, a hook and eye closure, or other fasteners known to those skilled in the art. Cover flap 280 includes an inner surface 282 and outer surface 284, with the inner surface 282 having fastener 278 attached thereto. The fastener 278 can be a fastener such as a hook and loop fastener, or the like which mates with the corresponding fastener 278.

When the individual has finished with the cart, the cover 200 is removed from the cart, the cover folded into a compact configuration, and inserted into the transport pocket 270, which is then closed so the individual can carry and store the cover.

In an alternative embodiment, the transport pocket can be separate from the cover, or can be attached to the cover by means of a removable fastener, such as hook and loop fasteners. In another embodiment, no pockets are present on the cover. While these embodiments are intended to be "child-safe", meaning that there shouldn't be any strangle or choke hazards associated with these embodiments, it is to be understand that others may use another type of closure, such as either a zipper or drawstring, and that these alternatives are to be considered within the scope of the present invention, as defined by the appended claims.

In alternate embodiments, the orientation of the pockets may differ from that shown herein, and one or more may be at an angle, or even upside-down with respect to the orientation shown in the drawings. This may occur in an embodiment designed for use on, for example only, a stroller whose handle configuration is different from the handle configuration of a shopping cart.

Depending upon the materials selected for each of the components of embodiments of the present invention, an adhesive, such as, for example only, a hot melt adhesive or a pressure sensitive adhesive, could be used in place of certain fasteners and certain areas of stitching.

Depending upon manufacturing preferences, the cover 200 can be manufactured from either single, double-layer, or multi-layer fabrics, or a combination thereof. The fabrics selected can be washable, so the cover 200 can be cleaned between uses; and it is intended to be a reusable device.

To utilize the cover 200, the cover is placed over the handle assembly 40 such that cover 200 envelops the handle 42 and the side handles 44, rear frame assembly crossmember 38, a portion of the side members 36 and the top end of long lift gate members 52. The fastener 230 interacts and secures the cover 200 within the leg openings 68 around cross-member 38. The cover 200 does not block access to the leg openings 68, and thus a child can be placed in the seat assembly after the cover 200 has been positioned on the cart.

Figure 5:
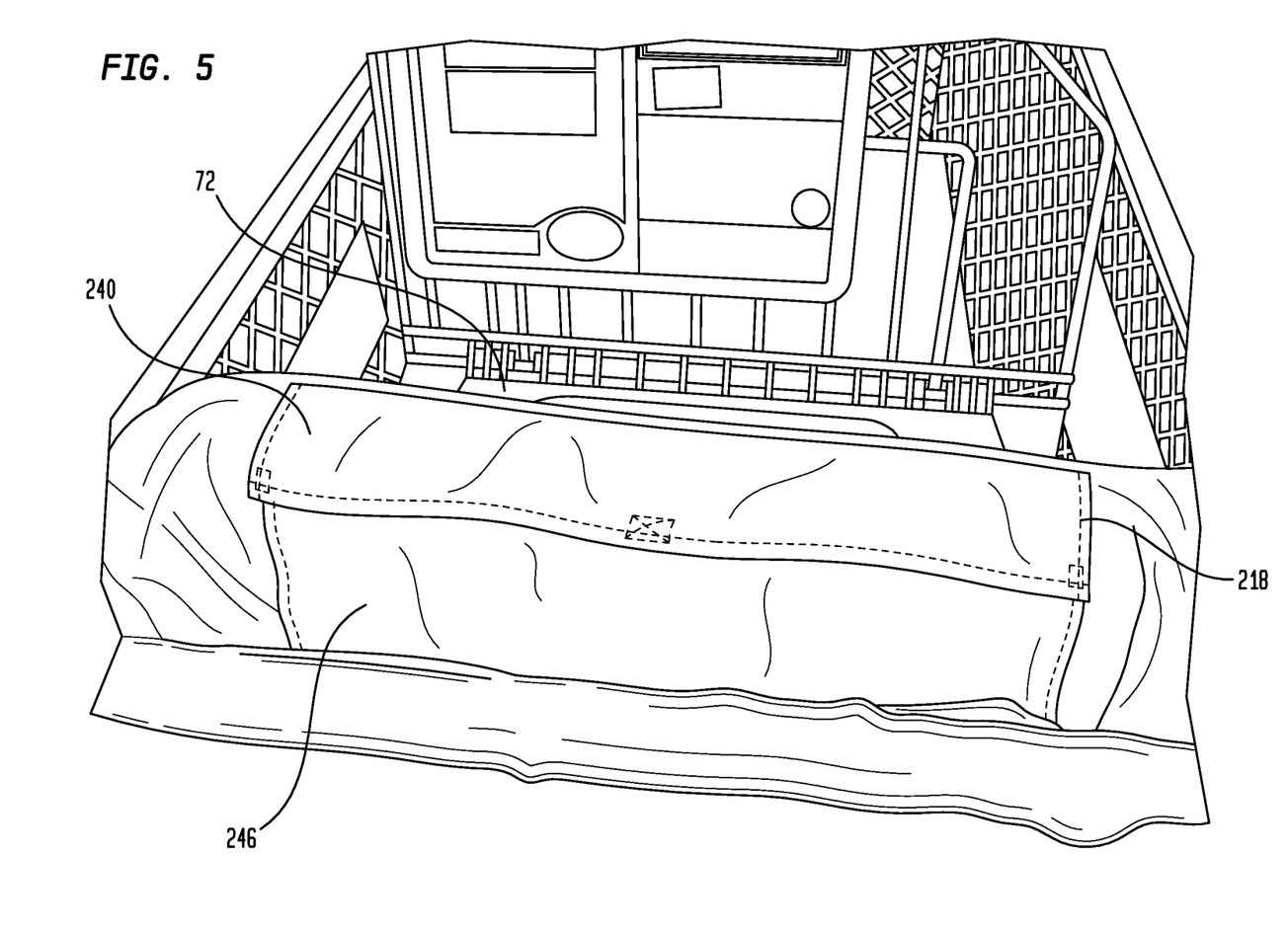
FIG. 5 shows a closed utility pocket attached to an embodiment of the present invention, as seen from the perspective of a user.

To utilize the cover 200, the front 210 and back 220 members are separated by pulling them, and the fasteners apart. The front member 210 is stretched so that it covers the top of the cart handle assembly as far as the leg openings. The back member 220 is stretched so that it envelopes the underside of the cart handle assembly 40 (FIGS. 4-5), and these steps can generally be done without having to touch the cart handle. As shown in FIGS. 4 and 5, the position of the cover 200 leaves the cart's seat 72 and the leg openings 68 exposed, so that a child (not shown) can be placed into the seat 72 in the customary manner. The position of the front and back members is controlled by the elastic band within them, enabling the cover 200 to be used on various sized carts. Because the cover 200 is made of fabric it can be conformed to cover attachments that might be present on the cart handle 40, such as the security mechanism 100. Thus, an embodiment of the cover 200 can be utilized in a method to reduce, or minimize the transmission of contaminants from the surface of a cart handle. An embodiment of the cover of the present invention could also be used in conjunction with a disinfecting wipe to reduce, or minimize, the transmission of contaminants from the surface of a cart handle, first by wiping the cart handle surface with a disinfecting wipe, followed by application of the cover over the cart handle.

To remove the cover, the user slips it off the cart handle. The cover is washable, reusable and durable, and because it is reusable rather than disposable, can be considered a "green product", or eco-friendly product. The embodiment shown in the figures is portable, unbreakable and should be non-hazardous to children because there are no detachable parts to choke on nor cords to strangle nor plastic to cause suffocation.

Thus, embodiments of the present invention envelop the entire length, width and depth of the handle bar apparatus both above and below it (FIGS. 4 and 5). The finished expanded length is sufficient to cover the entire handle bar apparatus of up to a typical full size, double seat shopping cart. The properties of the elastic band sewn into the cover's components enable the cover 200 to fit securely on smaller sized carts.

Figure 7:
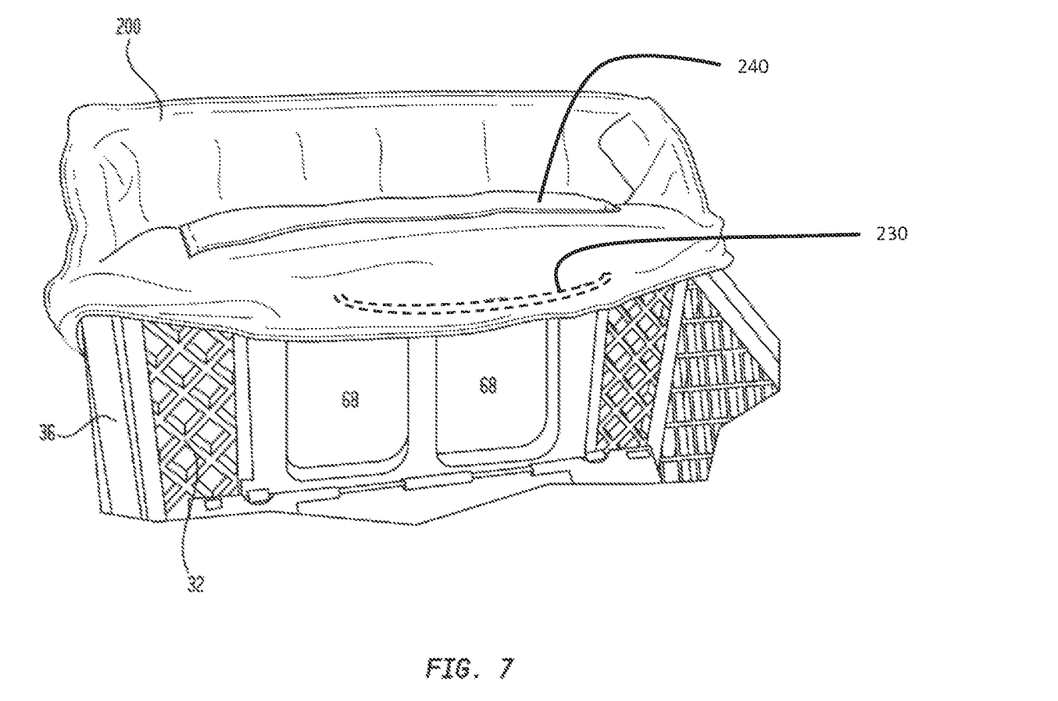
FIG. 7 illustrates an embodiment of the present invention containing merchandise or snack items.

In use, the cover 200 can also serve as a carrier for various items, such as a drink 400, or snack items 402 and 404 (FIG. 7), or other items. FIG. 7 shows the cover 200 from the direction of the seat, looking towards the covered cart handle. The items in the cover 200 are within the sight and the reach of a child when seated on the cart's seat 72.

Embodiments of the present invention can be prepared utilizing several different sized rectangular pieces of fabric, the fabric used consisting of a washable reusable, natural or manmade fabric, such as, for example only, cotton or nylon. In one embodiment, the components are prepared in the following order: the cover, the utility pocket, the storage pocket and the transport pocket, although manufacturing demands may result in one or more variations of the above sequence, as well as in the number and design of the various pockets.

When referring to the fabric, the terms "right side" and "wrong side", as known to those skilled in the art, mean the top side, or decorative surface of the fabric, and the bottom side, or non-decorative side of the fabric, respectively. A hem, as known to those skilled in the art, is generally formed and stitched on the "wrong side" of the fabric, and will be done in this manner, unless stated otherwise.

The order described below can be varied. Starting with the smallest piece of fabric 500, one prepares the storage pocket 260. The fabric 500 has a right side 502 and wrong side 504. The fabric is hemmed 506 on three sides (shown in phantom in FIG. 8A), and a length of a fastener 230 (such as a hook and loop fastener, or VELCRO® (registered trademark of Velcro Industries, B.V., Ltd.) is attached to the top edge of the wrong side 504. Another piece of hook and loop fastener is attached to the front surface 248 of a medium-sized piece of fabric 600 so that it becomes the opposing point of attachment of the storage pocket 260 (also shown in phantom) The storage pocket 260 is then attached, such as by sewing, to the front surface 248 of the medium-sized piece of fabric 600 on three sides leaving the opening 268 at the top.

Figure 9A:
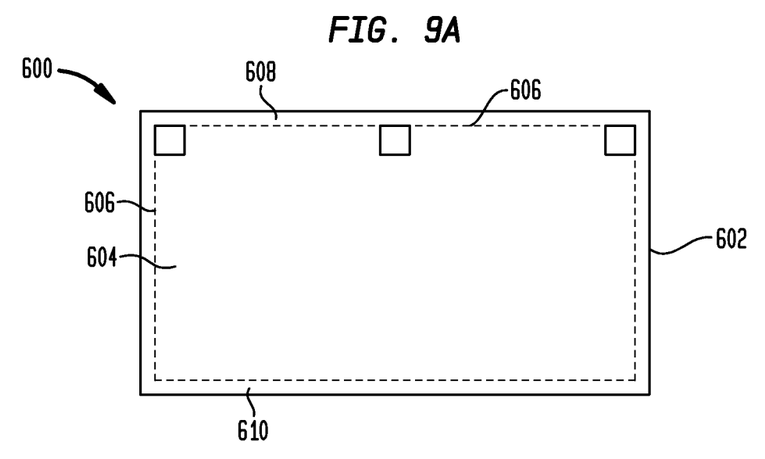
Figure 9B:
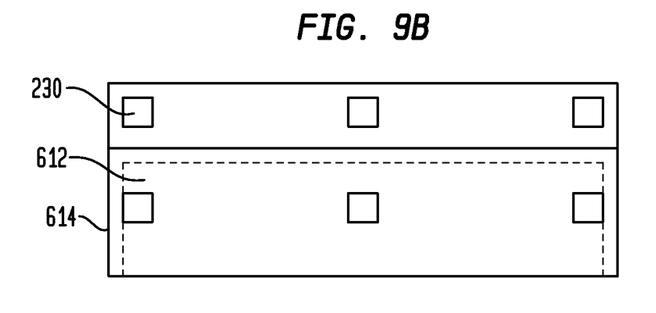

The intermediate-sized piece of fabric 600 will become the utility pocket 240. The fabric 600 has a right side 602 and wrong side 604. The fabric 600 is hemmed 606 along all four sides (shown in phantom in FIG. 9). A length of fastening material 230, such as a hook and loop or other type of fastener, is attached along the upper, inner edge 608 as well as its outer opposing edge 610 in the following manner. At a position that is approximately one-quarter the distance from the edge of a large piece of fabric 700, with the right sides together, they are sewn lengthwise at two points. The lower flap 612 is then folded over and sewn along the short sides 614 thereby forming the utility pocket 260 with the fasteners 230 being exposed.

Figure 10A:
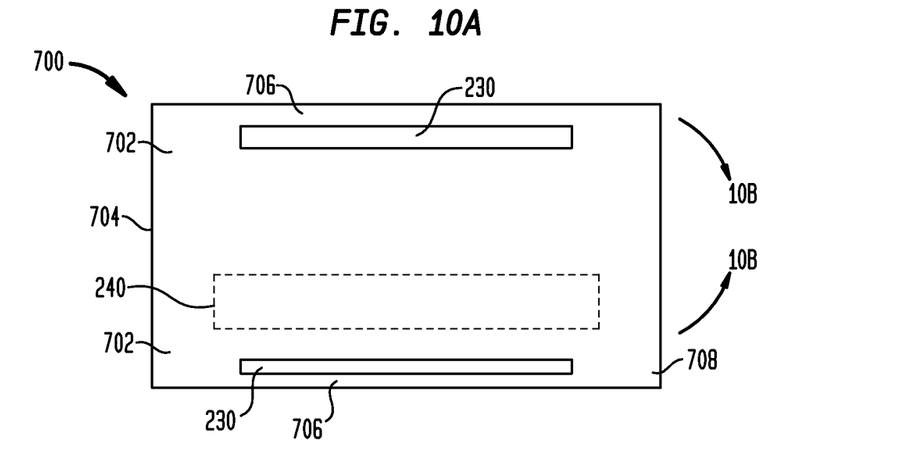
FIG. 10A illustrates the initial preparation of the cover. The arrow 10B indicates the direction of folding.
Figure 10B:
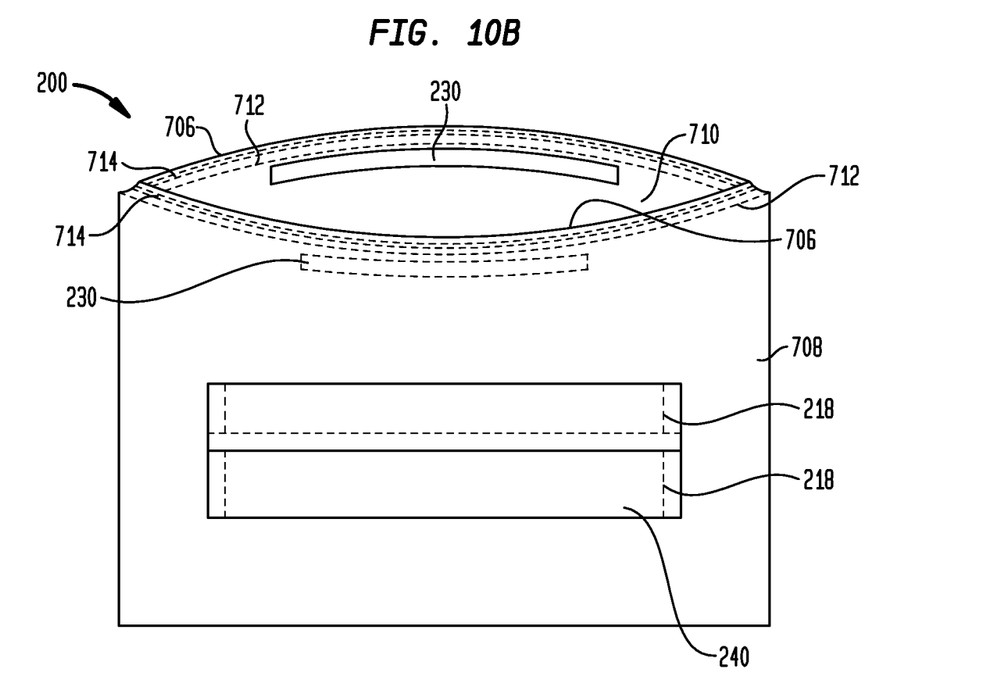
FIG. 10B illustrates the utility pocket and the elastic band (in phantom) after the fabric has been folded to form the cover.

To make the cover 200 (FIG. 10) the largest piece of fabric 700 with the utility pocket 260 attached is folded in half, such that the right sides 702 are facing, meeting the two longer edges 706 and sewn on the two short sides 708.

A length of hook and loop fastener 230 is centrally positioned on the long edges 706 of the resulting opening 710 and is sewn into the fabric, allowing enough room for a folded hem.

The two edges of the opening 710 are hemmed 712, and incorporate an elastic cord 714 which is sewn inside the hems. Care is taken to secure the start of the elastic cord at the start of the hem and to leave a small opening to draw the elastic through at the closure of the hem.

The elastic 714 is drawn through the hem 712 sufficiently to provide enough elasticity to secure the cover 200 onto the handle bar apparatus. Once drawn, the free end of the elastic is stitched, thereby securing it in the hem and giving the cover its stretching capability. The small opening is sewn.

The cover 200 is then turned right side out, and is ready to be used.

The construction of the transport pocket 270 is not shown in the drawings. The transport pocket 270 is prepared from a piece of fabric approximately the same size as that used for the utility pocket, but with a hook and loop fastener attached along the length of the fabric edges, such that they will mate with each other to close the pocket. The transport pocket 270 is attached to the outside surface of the cover (FIG. 3B). The transport pocket 270 can be used to store the cover when not being used, or for transport. In one embodiment, the transport compartment can be attached to the cover 200. In this embodiment, such attachment is done in the same manner as the attachment of the utility pocket 260 except that transport pocket 270 would be located on the back 220 of the cover on the outer side 222 and it may not contain a storage pocket.

Embodiments of the present invention can be manufactured from any one or more of a variety of materials. The fabric can be a natural fabric, such as a cotton, or a synthetic fabric, such as a nylon or a water-resistant fabric, or a combination thereof. The material can be a single layered fabric, a double-layered fabric, or a multi-layered fabric, or a combination of one or more of these fabrics. Leather, leather-like materials, and vinyl, could also be utilized. In certain embodiments, a double-layered fabric that is both washable and durable may be used, in order to withstand repeated use, and be cleaned between uses.

The fabric from which the embodiments are manufactured, and the pocket can be available in various pattern and color combinations to suit the consumer's taste. The fabric may be silk screened, embroidered, decorated, or otherwise provided with a space for indicia, such as names, logos or the like, as a means of personalization or promotion for potential advertisers.

While these embodiments are intended to be "child-safe", meaning that there shouldn't be any strangle or choke hazards associated with these embodiments, it is to be understand that others may use another type of closure, such as either a zipper or drawstring. It is also recognized that fasteners other than hook and loop fasteners, such as a snap, a button, a hook and eye closure, zipper or other fasteners known to those skilled in the art, and these alternatives are to be considered within the scope of the present invention, as defined by the appended claims.

Although this invention has been described with a certain degree of particularity, it is to be understood that the present disclosure has been made only by the way of illustration, and that numerous changes in construction and arrangement of parts may be resorted to without departing from the spirit and scope of the invention.

I claim:

1. A cover for a shopping cart handle assembly, the cover comprising:
   a bag having a front member and a rear member connected together so that an opening is formed therebetween, each member having an inner surface and an outer surface, the inner surfaces facing each other;
   fasteners attached to at least each inner surface and configured to interact with each other;
   a utility pocket attached to the front member and including a storage pouch therein; and
   a transport pocket attached to the rear member, the transport pocket being sized to contain the cover therein when the cover is compacted;
   wherein, upon deployment of the bag over the shopping cart handle assembly, the front member is configured to cover a handle and side handles of the shopping cart handle assembly, the rear member is configured to envelop an underside of the shopping cart handle assembly, and a portion of the front member with the utility pocket is configured to be positioned in an area between the handle and a lift gate having leg openings to form a well for storage;
   wherein the fasteners interact with each other to fasten the front and rear members within leg openings of the shopping cart handle assembly; and
   wherein the cover forms a barrier between the shopping cart handle assembly and a user.

2. The cover in accordance with claim 1, wherein the front and rear members each include an elastic band attached proximate the opening and configured to expand and contract the opening.

3. The cover in accordance with claim 1, wherein the utility pocket includes a closure fastener.

4. The cover in accordance with claim 1, wherein the fasteners are at least one of a hook and loop fastener, a zipper, a hook and eye closure, a snap and a button.

5. A cover for a shopping cart handle assembly that includes a handle, side handles, an adjacent cross bar, and leg openings below the cross bar, the cover comprising:
   a bag configured to cover and form a well to sit between the handle and the adjacent cross bar of the shopping cart handle assembly, and having a front member and a rear member connected together so that an expandable opening is formed therebetween, each member having an inner surface and an outer surface, the inner surfaces facing each other;
   fasteners attached to the front and rear members and configured to interact with each other; and
   a utility pocket attached to the front member and including a storage pouch therein;
   wherein, upon deployment of the bag over the shopping cart handle assembly, the front member is configured to cover the handle and side handles of the shopping cart handle assembly, the rear member is configured to envelop an underside of the shopping cart handle assembly, and a portion of the front member with the utility pocket is configured to be positioned in an area between the handle and a lift pate having the leg openings to form the well for storage;
   wherein the fasteners interact with each other to fasten the front and rear members within the leg openings of the shopping cart handle assembly; and
   wherein the cover forms a barrier between the shopping cart handle assembly and a user while still allowing access to the leg openings and a seat.

6. The cover in accordance with claim 5, wherein the front and rear members each include an elastic band attached proximate the expandable opening and configured to expand and contract the opening.

7. The cover in accordance with claim 5, wherein the utility pocket includes a closure fastener.

8. The cover in accordance with claim 5, wherein the fasteners are at least one of a hook and loop fastener, a zipper, a hook and eye closure, a snap and a button.

9. The cover in accordance with claim 5, wherein a transport pocket is attached to the rear member, the transport pocket being sized to contain the cover therein when the cover is compacted.

* * * * *